United States Patent Office 3,450,691
Patented June 17, 1969

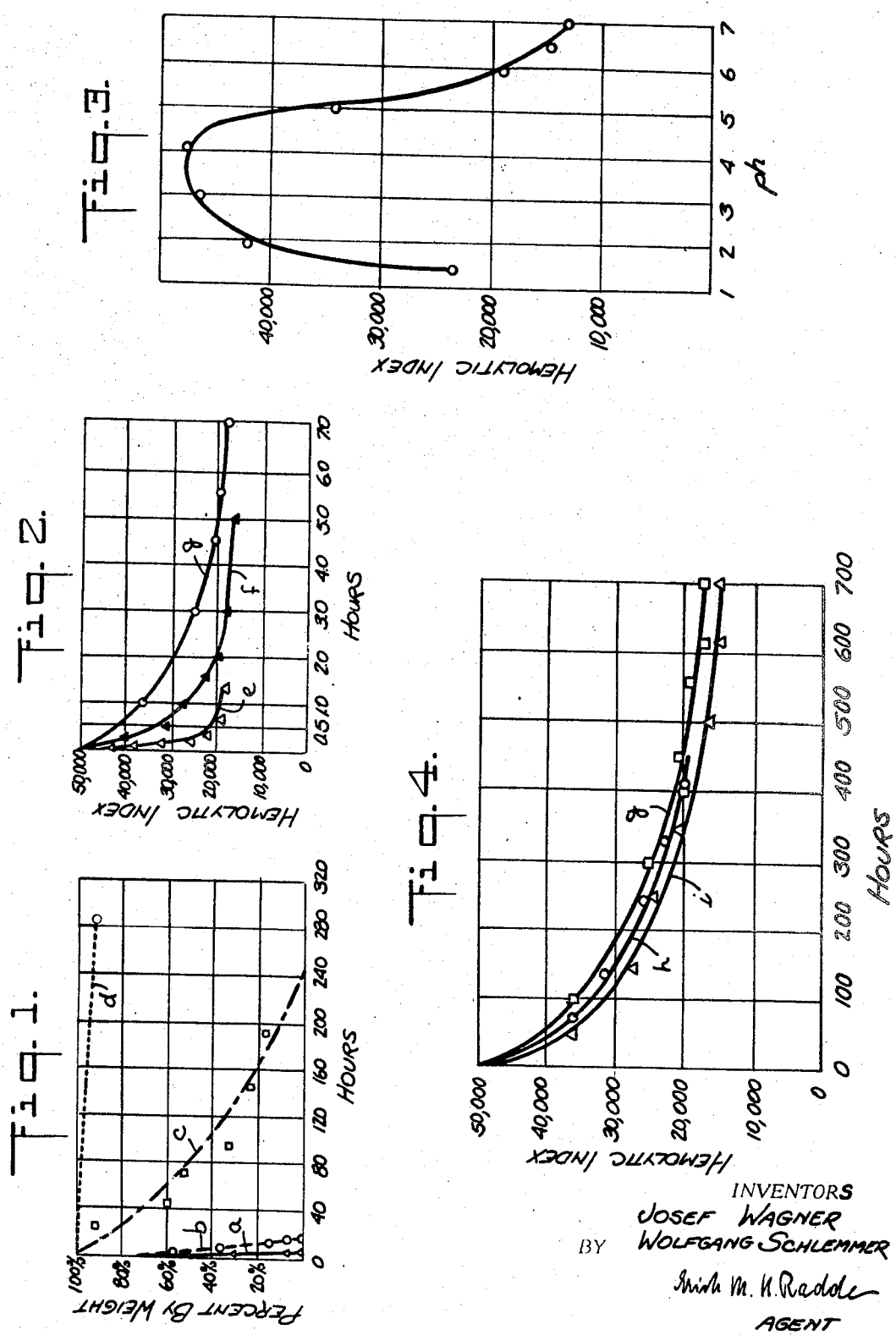
INVENTORS
JOSEF WAGNER
WOLFGANG SCHLEMMER
BY
AGENT

3,450,691
PROCESS OF PRODUCING A WATER SOLUBLE HORSE CHESTNUT SAPONIN OF LOW HEMOLYTIC ACTIVITY AND PRODUCT
Josef Wagner and Wolfgang Schlemmer, Munich, Germany, assignors to Chemisch-Pharmazeutische Fabrik Adolf Klinge & Co., Munich, Germany, a German company
Filed June 7, 1967, Ser. No. 644,117
Int. Cl. C07c *173/00*
U.S. Cl. 260—210.5                                   10 Claims

ABSTRACT OF THE DISCLOSURE

A process of converting a horse chestnut saponin which in its acid form is difficultly soluble in water and has a high hemolytic activity, i.e., $\beta$-escin, into a readily water soluble saponin of low hemolytic activity, i.e., $\alpha$-escin, by keeping the difficultly soluble saponin in aqueous solution of a pH between about 4.5 and about 7.5 and preferably between 6.0 and 6.9 until the hemolytic index of the saponin has decreased. The conversion temperature is between 10° C. and 100° C. and preferably between 60° C. and 90° C. The pH-value is preferably adjusted by means of an alkali metal hydroxide solution. An aqueous or aqueous-alcoholic horse chestnut extract may be used as starting material. The resulting $\alpha$-escin has a high anti-edematous activity and high foaming power.

---

The present invention relates to an improved process of producing a saponin and more particularly to a process of producing a water soluble saponin of low hemolytic activity from parts of the horse chestnut tree, especially its seeds, to products obtained thereby, to pharmaceutical compositions containing same, and to their therapeutic and technical use.

It is known, for instance, from U.S. Patent No. 3,110,711 to produce two escin isomers from the pure genuine horse chestnut saponin escin. These two isomers are designated as $\alpha$-escin of the melting point 225–227° C. and an optical rotation $[\alpha]^{25} = -13.5°$ (concentration: 5% in absolute methanol) which has a hemolytic index of about 1:20,000 and the sodium salt of which has a melting point of 250–252° C., and $\beta$-escin of the melting point 222–223° C. and an optical rotation $[\alpha]_D^{27} = -23.7°$ (concentration: 5% in absolute methanol) which has a hemolytic index of about 1:40,000 and the sodium salt of which melts at 250–252° C. $\alpha$-Escin is a white, amorphous powder while $\beta$-escin forms, on recrystallization from aqueous methanol white, leaflet-like crystals. $\alpha$-Escin is readily soluble in water and methanol, only slightly soluble in acetone, and insoluble in either and hydrocarbons, while $\beta$-escin is readily soluble in methanol, slightly soluble in acetone, but only very little soluble in water, and insoluble in ether and hydrocarbons.

$\alpha$-Escin now is the therapeutically preferred horse chestnut saponin because it is not only readily water soluble but also has a lower hemolytic index than $\beta$-escin. However, no method is known at present to convert the $\beta$-escin obtained together with $\alpha$-escin on extraction of horse chestnuts with a good yield into the more valuable $\alpha$-escin. The $\beta$-escin content of fresh horse chestnut extract considerably exceeds its $\alpha$-escin content. While the total triterpene glycoside content, i.e., the content of $\alpha$- and $\beta$-escin in an aqueous-alcoholic horse chestnut extract is about 18% ($\pm$5%) calculated for the dry extract, more than two thirds of said triterpene glycoside content of fresh extracts of fresh horse chestnuts consists of $\beta$-escin. If the horse chestnuts are stored in a faulty manner before extraction whereby enzymatic cleavage of the acyl and glycoside bonds may take place, the $\beta$-escin content may be reduced to below 3%. In general fresh extracts contain under normal conditions about 10% of $\beta$-escin and about 8% of $\alpha$-escin. It is evident that it is an important problem to find ways either to increase the water solubility of $\beta$-escin or to convert it into $\alpha$-escin. For this purpose $\beta$-escin has been suspended and ground in water in a mortar for 50 hours whereby a product which remains dissolved in water in a concentration up to 2% for several hours and which shows a non-crystalline, amorphous structure in the X-ray picture, was obtained.

An increase in its solubility in water was also achieved by introducing one to three acetyl groups into the molecule. Furthermore, $\alpha$-escin has been produced from horse chestnut extracts obtained by precipitation with cholesterol, i.e., from the adduct of cholesterol and the escin saponins which is substantially free of other saponins. Precipitation of aqueous or aqueous-alcoholic horse chestnut extracts with cholesterol is disclosed, for instance, in U.S. Patent No. 3,163,636 while separation of $\alpha$-escin from $\beta$-escin is described in the above mentioned U.S. Patent No. 3,110,711.

However, these methods of increasing the water solubility of the horse chestnut escin have a number of disadvantages. Thus the separation of $\alpha$-escin from the saponin-cholesterol adduct is rather complicated. Grinding and micronizing $\beta$-escin produces unstable solutions of low concentration only. Acetylation yields a partially changed escin.

Therefore, it was also believed that the most important and effective component of the horse chestnut saponins is the $\beta$-escin and that those saponins which remained in horse chestnut saponin extracts after precipitation and separation of the $\beta$-escin are worthless or are only of minor value on account of their low hemolytic index. Therefore, said residues had been discarded because it was assumed that the low hemolytic activity was caused by traces of $\beta$-escin which were not recovered by precipitation.

It is one object of the present invention to provide a simple and effective process of converting the difficultly water soluble $\beta$-escin of high hemolytic activity into the readily water soluble $\alpha$-escin of low hemolytic activity in a good yield and substantially without destroying or decreasing its pharmacological activity.

Another object of the present invention is to provide a simple and effective process of converting substantially all the escin components of horse chestnut extracts into the readily water soluble $\alpha$-escin of low hemolytic activity.

Still another object of the present invention is to provide highly concentrated and stable aqueous solutions of $\alpha$-escin and its alkali metal salts of low hemolytic activity.

A further object of the present invention is to provide pharmaceutical $\alpha$-escin compositions having a high anti-edematous activity.

Other objects of the present invention and advantageous features thereof will become apparent as the description proceeds.

In principle the process according to the present invention is based on the observation that an escin which, in its acid form, is difficultly soluble in water is converted into an escin which in its acid form is readily soluble in water by contacting said difficultly soluble escin with an aqueous solution of a pH exceeding a pH of 4.5, i.e. between about 5.0 and about 7.5, and preferably exceeding a pH of 6.0 and being lower than a pH of 7.0, for a prolonged period of time until the hemolytic index of said starting escin has descreased to between about 15,000 and about 22,000, and preferably to about 20,000. When proceeding in this manner, substantially no saponification of the escin to compounds of a lower acyl content takes place. Such a saponification of horse chestnut saponins, as is known, takes place relatively easily in an alkaline medium whereby acyl groups are split off and the difficulty soluble escinol is obtained which is hemolytically inactive. The escin component of horse chestnut extracts which in its acid form, it difficulty soluble in water, is known as β-escin which has a hemolytic index of about 40,000 while its readily water-soluble escin component is designated as α-escin.

The process according to the present invention thus permits to convert the greater part, and preferably all, of the so-called β-escin, the amount of which far exceeds the amount of the so-called α-escin in freshly prepared horse chestnut extract, into said highly valuable α-escin of a lower hemolytic index. This process is based on the observation that β-escin can be converted into α-escin and splitting off of acyl groups or, respectively, saponification to escinol can substantially be avoided by reducing the acidity of an aqueous-alcoholic horse chestnut extract or of a β-escin solution or suspension and adjusting the pH-value of said solution or suspension to a pH between about 5.0 and about 7.5, and in any case to a pH exceeding a pH of 4.5, and preferably to a pH exceeding 6.0 and lower than 7.0, by the addition of buffer compounds of about neutral reaction or, in a simple manner, by the addition of alkaline agents and by allowing such a neutralized solution to stand.

While the preferred alkaline agents are alkali metal hydroxides such as sodium hydroxide or potassium hydroxide, other alkaline agents which form substantially water soluble salts may also be used, for instance, alkaline earth metal hydroxides, such as magnesium hydroxide or calcium hydroxide, ammonia, or organic bases, for instance, tertiary amines such as trialkylamines, tris-(hydroxy methyl) amino methane, or others. The carbonates of the alkali metals and alkaline earth metals may also be used for neutralization whereby carbon dioxide is developed.

Buffer compounds and compositions have also proved to be useful for adjusting the pH-value of the β-escin suspension or solution to the desired pH-value, preferably to a pH between 6.0 and 7.0. Suitable buffer compositions are composed of sodium phosphate and citric acid (acetate buffer), monopotassium phosphate and disodium phosphate according to Soerensen which has a pH between 5.5 and 7.5, and others.

It has been found that β-escin is present in neutral medium in the form of an anion which is changed to α-escin, i.e. a saponin of a low hemolytic index and a high pharmacological activity, on standing at room temperature for a prolonged period of time. The conversion time can be reduced by keeping the solution at elevated temperature and preferably at a temperature between about 50° C. and about 96° C. Concentration of the starting material, pH-value of the conversion solution, and conversion time and temperature must be correlated with each other, i.e. the higher the pH-value and/or the temperature, the shorter the conversion time and vice versa. Determination of the hemolytic index permits readily to determine optimum conversion conditions for any given starting material and to avoid the formation of substantial amounts of hemolytically inactive saponification products.

The attached drawings illustrate the correlation between temperature, concentration, pH-value, and conversion time. In said drawings FIG. 1 illustrates graphically the conversion of β-escin sodium into α-escin sodium depending on the conversion temperature.

FIG. 2 illustrates graphically the conversion of β-escin sodium into a α-escin sodium depending on the concentration of the solultion.

FIG. 3 illustrates graphically the conversion of β-escin sodium into α-escin sodium depending on the pH-value of the conversion solution.

FIG. 4 illustrates graphically the conversion of β-escin in 0.1% and 10% solution in 0.15 molar or 0.25 molar buffer solution at various pH-values.

These FIGURES 1 to 4 illustrate results as they are obtained in the examples given hereinafter and, therefore, will be explained in said examples.

When proceeding according to the present invention, it is possible to produce in a simple manner a readily soluble α-escin from the β-escin which is difficulty soluble in water. Solutions of the readily water soluble α-escin are stable for several years. 0.1% to 10% aqueous solutions of said readily soluble α-escin can be heat sterilized without any decrease in hemolytic activity.

Higher concentrated aqueous α-escin solutions, for instance, 10% to 20% solutions, have the tendency to form associated molecules on prolonged storage. Such association becomes apparent by gelling of the solution. Such gelling disappears and a clear solution is again obtained on heating to 50–60° C. for a short period of time whereby no precipitation takes place.

Due to these advantageous chemical and physical properties α-escin solutions can be used for parenteral administration as well as for oral administration.

As stated above, the escin component, i.e. α-escin which represent the readily soluble component of horse chestnut extracts and which remains in solution when acidifying the extract and thus precipitating the water insoluble escin component, i.e. β-escin, has a surprisingly high anti-edematous activity. It inhibits edema formation and reduces manifest edema, for instance, stasis edema as with varicose veins and postthrombotic syndrome; congestion edema such as encountered in brain injuries and brain tumors; and toxis edema such as edema of the lungs. α-Escin enhances capillary resistance, i.e. it reduces capillary fragility as encountered in hypertension. It has been found to also favorably affect bronchial asthma of allergic origin. In all these indications it is of high value in view of its low hemolytic index.

Its anti-edematous activity is readily determined by means of the test method whereby the effect of α-escin administration on the edema caused by burning is measured as described by Spector and Willoughby in "Journ. Pathol. Bacteriol.," vol. 78, page 121 (1959), or on the rat's paw edema as described by Nodine and Siegler in "Pharmacological Techniques in Drug Evaluation," published by Year Book Medical Publisher, Chicago (1964).

The hemolytic activity of horse chestnut saponins and of α- and β-escin is preferably determined by the photometric method given hereinafter. This method yields results of optimum accuracy. According to this method the extinction of the blood dyestuff stabilized as cyanohemoglobin which is caused to enter into solution by the horse chestnut saponins is measured. Thereby that concentration of the saponin to be tested is correlated with the concentration of a standard saponin, for instance, of β-escin with a hemolytic index of 1:40,000 which causes dissolution of half of a 2% erythrocyte suspension at a pH of 7.2 after standing at room temperature for 24 hours. The erythrocyte suspension is obtained by mixing equal volumes of a 4% suspension of male sheep erythrocytes with equal volumes of the saponin solution. This test is used hereinafter to determine progressive conversion of β-escin in α-escin according to the examples given hereinafter.

While, as stated above, heretofore the water soluble components of horse chestnut extracts with their low hemolytic activity were discarded because they were considered to be ineffective, it is the purpose of the present invention, in contrast thereto, to recover as large an amount of said water soluble component, i.e. of α-escin and, due to the conversion of β-escin into α-escin, a very considerably larger amount thereof as is initially present in the freshly prepared extract of freshly collected horse chestnuts.

According to a preferred embodiment of the present invention the starting material is a horse chestnut extract and especially a freshly prepared extract from freshly collected horse chestnut seeds. After extraction which is preferably carried out with a mixture of water and ethanol or methanol, the extract is worked up and β-escin in its acid form is precipitated therefrom, for instance, by the addition of a strong acid such as sulfuric acid or hydrochloric acid or by the use of a cation exchange agent. Suitable cation exchange agents are those agents which possess a satisfactory exchange capacity at a pH below 3.0, such as the cation exchange agents known to the trade as "Dowex 50," "Amberlite IR–120," or the like.

The resulting β-escin is then converted into its salts, preferably into its alkali metal salts such as its sodium salt. Salt formation is effected by dissolving β-escin in aqueous alkali metal hydroxide solution, for instance, in aqueous sodium hydroxide solution, preferably an 0.1 N to N solution, until the pH-value of the resulting solution of β-escin is adjusted between about 4.5 and about 7.5 and preferably between 6.4 and 6.9. The solution is then allowed to stand at room temperature. Preferably the solution is heated whereby the pH-value may decrease to a pH of about 6.0 due to a small amount of acyl groups being split off thereby. The pH-value can be maintained between 6.4 and 6.9 by adding buffer compounds and compositions to the solution. Depending upon the time during which the β-escin solution is kept at a pH between about 4.5 and about 7.5 and preferably between 6.0 and 6.9, upon the temperature during said exposure to said pH-value, and upon the concentration of β-escin in the solution, it is partly or completely converted into a compound which, in its acid form, is soluble in water.

It is, of course, possible to use other alkali metal hydroxides or carbonates, alkaline earth metal hydroxides or carbonates, ammonia, or organic amines as mentioned hereinabove for solubilizing the β-escin and converting it into α-escin, in place of sodium hydroxide.

According to a further embodiment of the present invention conversion of β-escin into α-escin is carried out in such a manner that only part of the β-escin is converted into the water soluble α-escin. The unconverted β-escin is separated from the water soluble conversion product by acidifying the conversion solution, preferably to a pH between about 1.5 and about 2.0. Thereby, the free acid form of β-escin which is difficultly soluble in water precipitates.

Preferably the acidified conversion solution is heated, if required, to 70° C. to 80° C. because the α-escin retains in solution any unconverted β-escin even at a strongly acid pH-range. Heating causes the β-escin to rapidly precipitate. Precipitation of β-escin takes also place when allowing the conversion mixture to stand for a prolonged period of time, i.e. for several days. The precipitate is separated from the acidified solution, preferably by filtration or centrifuging. The thus separated β-escin may again be dissolved in an aqueous solution of an alkali metal hydroxide or another alkaline agent to a pH between about 4.5 and about 7.5 and may be further converted into the water soluble saponin on allowing the solution to stand, preferably while heating moderately. In this manner it is possible to recover any unconverted starting material from the conversion mixture so that optimum recovery of the pharmacologically effective α-escin is achieved.

Of course, the unconverted β-escin recovered from a preceding batch may also be mixed with fresh β-escin and the mixture may be subjected to conversion into α-escin as described hereinabove.

As stated above, the conversion time, temperature, and concentration are important factors in achieving a high conversion rate. In addition thereto the pH-value of the solution in which conversion of β-escin into α-escin takes place, is also of importance. pH-values between 4.5 and 2.5 strongly inhibit conversion. At a pH-value lower than 2.5 the speed of reaction again increases. However, cleavage of the glycoside bond is observed as a side-reaction with increasing hydrogen ion concentration. The speed of conversion also increases with increasing pH-values starting with a pH-value of about 4.5. After surpassing the point of equivalency, i.e. a pH of 7.5, the formation of saponification products increases with decreasing hydrogen ion concentration and rapid cleavage of the escin takes place.

As stated above, the speed of conversion as well as the rate of conversion are determined by the temperature at which the solution is kept. Favorable results are achieved at a temperature ranging from room temperature to 100° C. and preferably at a temperature of 50° C. to 96° C.

Instead of precipitating the β-escin from its extract solution by acidifying or passing through a cation exchange agent and of thus separating the β-escin from α-escin and the other components present in the extract, it is also possible according to a preferred embodiment of the present invention to keep the freshly prepared horse chestnut extract without further preparatory treatment near its neutralization point, i.e. at a pH between 6.0 and 6.9 at room temperature for a predetermined period of time or at elevated temperature for a shorter period of time. Thereby it is possible to quantitatively convert all the β-escin initially present in the extract, into α-escin. Of course, conversion time, temperature, and pH-value as well as saponin concentration of the extract follow also the above given rules and must be correlated with each other.

The following examples serve to illustrate the present invention without, however, limiting the same thereto.

EXAMPLE 1

The starting material is a β-escin which was highly purified by repeated reprecipitation and the melting point of which was 223–224° C. Sodium hydroxide solution is added to a 15% aqueous suspension of said β-escin until the pH-value is increased to the required pH-value. Thereby the β-escin is converted into its water soluble sodium salt. The resulting solution is diluted to an 0.1%, a 1% or, respectively, a 10% solution of the sodium salt of β-escin. This solution of the sodium salt of β-escin is then kept at the indicated temperature and for the stated time to cause conversion of β-escin into α-escin. After the stated conversion time the solution is then passed through a cation exchange column. The acid solution running off therefrom is then heated at 96° C. for 7 minutes to precipitate any unconverted β-escin. The precipitate is removed by centrifuging. The centrifuged solution is evaporated to dryness in a vacuum and the residual α-escin is weighed.

In all these tests the hemolytic index of the water soluble α-escin is about 50% of that of the starting β-escin. The following Tables I to VI show the amount of α-escin in percent of the starting β-escin after conversion, i.e. the rate of conversion at different pH-values as a function of time, temperature and concentration.

TABLE I
[Conversion temperature, 90° C.; initial pH, 6.9; final pH, 5.7]

| Concentration | Percent by weight after a conversion time in hours | | | | | | | |
|---|---|---|---|---|---|---|---|---|
| | 2 | 3½ | 5 | 6½ | 9 | 10 | 14 | 18 |
| 1% | 49 | 74 | 84 | 87 | 100 | | | |
| 10% | | 43 | 55 | 64 | | 74 | 85 | 100 |

Curve b of Fig. 1 illustrates the results obtained with a 10% β-escin solution.

TABLE II
[Conversion temperature, 68° C.; initial pH, 6.9; final pH, 5.3]

| Concentration | Percent by weight after a conversion time in hours | | | | | | |
|---|---|---|---|---|---|---|---|
| | 24 | 48 | 72 | 96 | 144 | 192 | 240 |
| 1% | 47 | 80 | 92 | | | | |
| 10% | 19 | 40 | 48 | 67 | 78 | 83 | 100 |

Curve c of Fig. 1 illustrates the results obtained with a 10% β-escin solution.

TABLE III

[Conversion temperature, 50° C.; initial pH, 6.9; final pH, 5.3]

| Concentration | Percent by weight after a conversion time in hours | |
|---|---|---|
| | 68 | 288 |
| 1% | 26 | |
| 10% | 8 | 10 |

Curve d of Fig. 1 illustrates the results obtained with a 10% β-escin solution.

TABLE IV

[Conversion temperature: 100° C.; initial pH, 6.9; final pH, 5.8]

Concentration of 10%

| After a conversion time in hours: | Percent by weight |
|---|---|
| 1½ | 46 |
| 3 | 70 |
| 5 | 92 |
| 6½ | 100 |

Curve a of FIG. 1 illustrates the results obtained with a 10% β-escin solution.

TABLE V

[Conversion temperature: 100° C.; pH, 5.2]

Concentration of 0.1%

| After a conversion time in hours: | Percent by weight |
|---|---|
| ½ | 44 |
| 1½ | 72 |
| 2½ | 81 |
| 3½ | 91 |
| 5 | 100 |

TABLE VI

[Conversion temperature: 22° C.; pH, 7.4]

Concentration of 0.1%

| After a conversion time in hours: | Percent by weight |
|---|---|
| 68 | 44 |
| 142 | 56 |
| 244 | 75 |
| 233 | 84 |
| 404 | 96 |

EXAMPLE 2

10 g. of β-escin of the melting point 223–224° C. are suspended in 50 cc. of water. N sodium hydroxide solution is carefully added thereto to adjust the pH-value of the resulting clear solution to a pH of 6.9. The resulting solution of the sodium salt of β-escin is diluted with water to a volume of 100 cc., i.e. to a 10% sodium β-escinate solution. This solution is heated at 90° C. for 14 hours. After cooling, 100 cc. of water are added thereto and the diluted conversion solution is passed through a cation exchange column of about 50 cc. of the cation exchange agent known to the trade as "Dowex 50, X–4". The effluent acid solution is heated to about 90° C. for 7 minutes. The precipitated β-escin is removed by centrifuging. The slightly turbid solution is clarified by pressure filtration and the filtrate is evaporated dryness in a vacuum by means of a rotating evaporator. Yield: 8.5 g. (85%) of water soluble saponin, i.e. α-escin of a hemolytic activity of about 1:20,000.

EXAMPLE 3

10 g. of β-escin are suspended in 50 cc. of water. N potassium hydroxide solution is carefully added thereto in an amount sufficient to adjust the mixture to a pH of 6.9. The resulting clear solution is diluted to a volume of 100 cc. Said 10% potassium escinate solution is heated in an autoclave to 100° C. for 6½ hours. After cooling, the solution is passed through a cation exchange column of "Dowex 50." The acid solution running off from said column does not shown a β-escin precipitate on boiling for 10 minutes. The solution is evaporated to dryness in a rotating evaporator. Yield: 100% of α-escin of a hemolytic activity of about 1:20,000.

EXAMPLE 4

One g. of sodium β-escinate is suspended in 1000 g. of an 0.15 molar acetate buffer solution of a pH of 5.2. The mixture is heated in an autoclave at 100° C. for 5 hours. The initial turbidity of the solution is caused by the presence of β-escin at the pH 5.2. It disappears completely after heating the mixture for a short period of time due to conversion to α-escin.

EXAMPLE 5

One g. of sodium β-escinate is dissolved in 1000 cc. of 0.15 molar phosphate buffer solution of the pH of 5.2. The solution is heated in an autoclave to 100° C. The solution which initially is somewhat turbid due to part of β-escin being not dissolved at the pH of 5.2, has become clear after heating for a short period of time. After heating is continued for 5 hours, the hemolytic index of the dissolved α-escin is about 1:20,000.

EXAMPLE 6

Dried horse chestnuts are extracted by means of 60% ethanol at room temperature. The ethanol is distilled off from the freshly prepared extract which is then adjusted by the addition of water to a dry content of 10%. N/10 sodium hydroxide solution is carefully added to the aqueous saponin extract to adjust its pH-value to a pH of 6.7. The conversion solution is heated at 96° C. for two hours. On acidifying the solution to a pH of 2.0 and heating to 96° C. for 10 more minutes, no β-escin precipitates. In contrast thereto an extract which has not been adjusted to a pH of 6.7 and has not been heated yields on acidification a precipitate of β-escin. The hemolytic activity of the heated extract has been reduced by about one fourth indicating that the β-escin present in the extract has been converted into the water soluble α-escin.

In place of the aqueous ethanol extract, there may also be used an aqueous methanol extract.

EXAMPLE 7

β-Escin with a hemolytic index of 1:50,000 is heated in 0.1% solution in the following buffer solutions at pH-values of 1.5, 1.9, 3.0, 4.0, 5.0, 6.0 and 7.0 at 100° C. for two hours.

| pH: | Composition of buffer solution |
|---|---|
| 1.5 | 86.1 ml. of 0.066 molar HCl and 13.9 ml. of molar sodium citrate; |
| 2.0 | 71.5 ml. of 0.066 molar $H_3PO_4$ and 28.5 ml. of 0.066 molar $KH_2PO_4$; |
| 3.0 | 99.2 ml. of 0.066 molar $KH_2PO_4$ and 0.8 ml. of 1.0 molar $H_3PO_4$; |
| 4.0 | 99.21 ml. of 0.066 molar $KH_2PO_4$ and 0.79 ml. of 0.08 molar $H_3PO_4$; |
| 5.0 | 99.05 ml. of 0.066 molar $KH_2PO_4$ and 0.95 ml. of 0.066 molar $Na_2HPO_4$; |
| 6.0 | 87.7 ml. of 0.066 molar $KH_2PO_4$ and 12.3 ml. of 0.066 molar $Na_2HPO_4$; |
| 7.0 | 61.2 ml. of 0.066 molar $Na_2HPO_4$ and 38.8 ml. of 0.066 molar $KH_2PO_4$. |

Thereafter, the hemolytic index is determined. The curve given in FIG. 3 illustrates the results obtained whereby the hemolytic index is given as axis of ordinates while the pH-value is given as axis of abscissas.

The curve clearly shows that no decrease in hemolytic activity takes place at a pH between about 3.0 and about 4.0. It is evident that a decrease of the pH-value to a pH of 1.0 as well as an increase to a pH of 7.0 causes a considerable decrease in hemolytic activity. However, at the acid pH between about 3.0 and about 1.0 a noteworthy glycosidic cleavage is observed as is found by thin layer chromatography. When heating at the neutral pH-range, no cleavage and decomposition products are formed.

EXAMPLE 8

The curves plotted in FIGS. 2 and 4 show that the isomerization of β-escin to α-escin at a pH value below or, respectively, above a pH of 6.5, namely at a pH of about 5.2 or, respectively, at a pH of about 7.4 proceeds in approximately the same manner as at a pH of 6.5. To cause the reaction to proceed in readily measurable periods of time, the isomerization at a pH of 5.2 is effected at 100° C. and that at a pH of 7.4 at about 22° C., i.e. at room temperature. Isomerization at a pH of 5.2 is considerably retarded and at a pH of 7.4 correspondingly accelerated in comparison to isomerization at a pH of 6.5.

Curve e of FIG. 2 shows that an 0.1% solution of β-escin in a buffer solution is converted into α-escin at a pH of 6.5 (buffer solution composed of 50 ml. of 0.25 molar $Na_2HPO_4$ and 50 ml. of 0.25 molar $KH_2PO_4$) by heating to 100° C. within about 40 minutes, while at a pH of 5.2 (buffer solution composed of 96.71 ml. of 0.15 molar $KH_2PO_4$ and 3.29 ml. of 0.15 molar $Na_2HPO_4$ or, respectively, 85.05 ml. of 0.15 molar sodium acetate and 14.95 ml. of 0.15 molar acetic acid)—FIG. 4, curve h— about four hours are required. While 90% conversion of an 0.1% solution of β-escin in an 0.25 molar buffer solution at a pH of 6.5 and a conversion temperature of 20° C. has been calculated to take place within about $10^4$ hours, the conversion time of the same 0.1% solution of β-escin is shortened at a pH of 7.4 (buffer solution composed of 85.3 ml. of 0.15 molar $Na_2HPO_4$ and 14.7 ml. of 0.15 molar $KH_2PO_4$) and a conversion temperature of 22° C. to about 400 hours (FIG. 4, curve i, the abscissa of which indicating the hours multiplied by the factor 100).

Curves g in FIGS. 2 and 4 show that conversion of a 10% β-escin solution in 0.2 molar buffer solution proceeds at a pH of 6.5 (buffer solution composed of 50 ml. of 0.25 molar $Na_2HPO_4$ and 14.7 ml. of 0.15 molar $KH_2PO_4$) and a temperature of 100° C. within about 6½ hours, while conversion of a 1% β-escin solution requires two hours (FIG. 2, curve f) and that of an 0.1% β-escin solution only about 40 minutes (FIG. 2, curve e). It follows from these tests that, when operating at the same pH-value and conversion temperature, the rate of conversion is dependent on the concentration of the β-escin solution.

Of course, many changes and variations in the starting materials, the neutralizing agents and buffer compounds and compositions, the concentration of the β-escin in the starting material, the pH-value during conversion, the conversion conditions, temperature, and duration, the methods of separating unconverted β-escin from the conversion solution and of purifying and isolating the resulting α-escin therefrom, and the like may be made by those skilled in the art in accordance with the principles set forth herein and in the claims annexed hereto.

We claim:
1. In a process for producing a water soluble horse chestnut saponin of relatively low hemolytic activity, the improvement which comprises contacting a β-escin which, in its acid form, is difficultly soluble in water, with an aqueous solution which has a pH between about 4.5 and about 7.5 until the hemolytic index of said escin has decreased to between about 15,000 and about 22,000.
2. The process according to claim 1, wherein the aqueous solution has a pH value exceeding 6.0 and being lower than 7.0.
3. The process according to claim 1, wherein contacting is effected at a temperature between about 10° C. and about 100° C.
4. The process according to claim 1, wherein β-escin is contacted with an aqueous solution of a pH between 6.0 and 6.9 at a temperature between about 60° C. and about 96° C. until the hemolytic index of the escin in said solution has decreased to between about 15,000 and about 22,000.
5. The process according to claim 1, wherein the starting escin is an aqueous solution of an alkali metal salt of β-escin.
6. The process according to claim 1, wherein the starting escin is β-escin obtained from a horse chestnut extract by passing through a cation exchange agent and separated from the other components of said extract.
7. The process according to claim 1, wherein the starting escin is a horse chestnut extract containing β-escin.
8. The process according to claim 1, wherein unconverted β-escin is separated from the conversion solution by acidifying and removing the precipitate.
9. The process according to claim 8, wherein the conversion solution is acidified to a pH of about 1.5 to about 2.0 and precipitation of β-escin is completed by heating to at least 90° C.
10. In a process for producing α-escin, the improvement which comprises contacting β-escin which, in its acid form, is difficultly soluble in water, with an aqueous solution which has a pH between about 4.5 and about 7.5 for a period of time sufficient to convert at least part of said β-escin into α-escin, removing any unconverted β-escin from the solution, repeating contacting of the unconverted β-escin with an aqueous solution of a pH between about 4.5 and about 7.5, removing any unconverted β-escin from the solution, and recovering the converted α-escin from the solution.

References Cited
UNITED STATES PATENTS 3,110,711  11/1963  Wagner et al. _____ 260—210.5
3,151,108  9/1964  Bosse et al. _____ 260—210.5

LEWIS GOTTS, Primary Examiner.

J. R. BROWN, Assistant Examiner.